(12) United States Patent
Matoba et al.

(10) Patent No.: US 10,801,424 B2
(45) Date of Patent: Oct. 13, 2020

(54) SUPERCHARGING DEVICE FOR ENGINE

(71) Applicant: Mazda Motor Corporation, Aki-gun, Hiroshima (JP)

(72) Inventors: Yasunori Matoba, Hiroshima (JP); Takaya Okugawa, Hiroshima (JP); Yuki Hikichi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/281,323

(22) Filed: Feb. 21, 2019

(65) Prior Publication Data

US 2019/0277208 A1    Sep. 12, 2019

(30) Foreign Application Priority Data

Mar. 7, 2018 (JP) .................. 2018-040409

(51) Int. Cl.
*F02D 23/02* (2006.01)
*F02B 33/38* (2006.01)
(Continued)

(52) U.S. Cl.
CPC .............. *F02D 23/02* (2013.01); *F02B 33/38* (2013.01); *F02B 33/44* (2013.01); *F02B 39/12* (2013.01); *F02B 39/16* (2013.01); *F02D 23/005* (2013.01); *F02D 41/0007* (2013.01); *F04D 25/026* (2013.01); *F02B 37/162* (2019.05); *F02D 41/064* (2013.01); *F02D 2200/022* (2013.01);
(Continued)

(58) Field of Classification Search
CPC .......... F02B 33/00; F02B 33/38; F02B 33/44; F02B 39/12; F02B 39/16; F02B 37/162; F02D 23/005; F02D 23/02; F02D 41/0007; F02D 2200/022; F02D 2200/023; F02D 2200/04; F02D 2200/0414; F02D 2200/501; F02D 2250/11; F02D 41/064; F04D 25/026; F05B 2270/105; F05B 2270/602
See application file for complete search history.

(56) References Cited

U.S. PATENT DOCUMENTS

2016/0061104 A1    3/2016 Hirayama
2018/0202349 A1*   7/2018 Kindl ................. F02D 41/0007

FOREIGN PATENT DOCUMENTS

JP    2015129457 A     7/2015
JP    6281504 B2  *    2/2018

OTHER PUBLICATIONS

Machine translation of JP-6281504-B2 (Year: 2018).*

* cited by examiner

*Primary Examiner* — Brandon D Lee
(74) *Attorney, Agent, or Firm* — Alleman Hall Greasman & Tuttle LLP

(57) ABSTRACT

A supercharging device for an engine is provided, which includes a supercharger provided to an intake passage of the engine, an actuator configured to drive the supercharger, and a controller including a processor configured to control the actuator to drive the supercharger when an operating state of the engine is in a given supercharging range, and to stop the supercharger when the operating state is in a non-supercharging range. The controller estimates an amount of condensate accumulated in an oil pan, and the controller causes the actuator to forcibly drive the supercharger when the estimated amount of condensate is more than a preset amount, even if the operating state is in the non-supercharging range.

7 Claims, 8 Drawing Sheets

(51) Int. Cl.
 *F02B 33/44* (2006.01)
 *F02D 41/00* (2006.01)
 *F02B 39/16* (2006.01)
 *F02B 39/12* (2006.01)
 *F04D 25/02* (2006.01)
 *F02D 23/00* (2006.01)
 *F02D 41/06* (2006.01)
 *F02B 37/16* (2006.01)

(52) U.S. Cl.
 CPC .... *F02D 2200/023* (2013.01); *F02D 2200/04* (2013.01); *F02D 2200/501* (2013.01); *F02D 2250/11* (2013.01); *F05B 2270/105* (2013.01); *F05B 2270/602* (2013.01)

SUPERCHARGING DEVICE FOR ENGINE

TECHNICAL FIELD

The present disclosure relates to a supercharging device for an engine, particularly to the supercharging device which drives a supercharger when an operating state of the engine is in a given supercharging range.

BACKGROUND OF THE DISCLOSURE

Conventionally, engines with a supercharger in which a part of an intake passage upstream of the supercharger is connected with a part downstream of an intercooler through a bypass passage to bypass the supercharger, are known. Normally, the engines with the supercharger is controlled so that, the supercharger is driven when an operating state is in a given supercharging range (e.g., a high engine speed or high load range), and is stopped when the operating state is in a non-supercharging range.

Moreover, it is also known that, in order to improve the exhaust emission capability, exhaust gas recirculation (EGR) gas containing nitrogen oxide and blowby gas containing unburned hydrocarbon are recirculated to a part of the intake passage upstream of the supercharger. When moisture contained in EGR gas or blowby gas is condensed in the intake passage upstream of the supercharger, condensate is produced and the condensate flows into the supercharger together with intake air. Particularly, the moisture contained in the blowby gas is mainly produced by reserved water in an oil pan being evaporated. During operation of the engine, the reserved water increases when the temperature of oil in the oil pan is low, and the reserved water decreases when the oil temperature increases because evaporation is stimulated.

For example, JP2015-129457A discloses an internal combustion engine which addresses a technology to remove condensate produced inside an intake passage. This engine includes a supercharger comprised of a turbine and a compressor, an EGR device which recirculates a portion of exhaust gas to the intake passage through an EGR passage, a bypass passage which bypasses the compressor in the intake passage, and an air bypass valve provided to the bypass passage, and an intake temperature sensor provided to the intake passage. The engine is also provided with a mechanism to open the air bypass valve when an intake temperature is lower than a condensing temperature of moisture. Thus, during a cold start, a control device causes the compressor to recirculate adiabatically-compressed air through the bypass passage to increase the intake temperature to accelerate evaporation (removal) of the condensate generated in the intake passage.

At an extremely low temperature, the condensate inside the intake passage is frozen inside the supercharger, which may result in issues in the function of the supercharger. Particularly, for a mechanical supercharger in which a transmission belt is wound around a pulley coupled to an engine crankshaft and a pulley of the supercharger is driven through the transmission belt, if ice exists between rotors and a casing, the ice impedes rotation of the rotors, which may cause issues, such as burning or seizure of the transmission belt.

Then, at an engine startup, when the temperature of the supercharger is low, it is possible to increase the temperature of the supercharger (an inner wall temperature of the supercharger) to avoid freezing of the condensate and to secure the function of the supercharger by forcibly driving the supercharger, even if the operating state is in the non-supercharging range. However, it is desirable not to perform the forcible drive of the supercharger when the possibility of ice being produced inside the supercharger is high before the engine startup.

As described above, since fuel consumption increases when the supercharger is forcibly driven, it is desirable to minimize the forcible drive of the supercharger. Particularly, when the amount of reserved water in the oil pan is very little, since the possibility that the condensate is produced inside the intake passage is low, it is disadvantageous to forcibly drive the supercharger.

SUMMARY OF THE DISCLOSURE

One purpose of the present disclosure is to provide a supercharging device for an engine which can secure the function of a supercharger during a cold start, without causing an increase in fuel consumption.

According to one aspect of the present disclosure, a supercharging device for an engine is provided, which includes a supercharger provided to an intake passage of the engine, an actuator configured to drive the supercharger, and a controller including a processor configured to control the actuator to drive the supercharger when an operating state of the engine is in a given supercharging range, and to stop the supercharger when the operating state is in a non-supercharging range, the controller estimating an amount of condensate accumulated in an oil pan, and the controller causing the actuator to forcibly drive the supercharger when the estimated amount of condensate is more than a preset amount, even if the operating state is in the non-supercharging range.

According to this configuration, the controller causes the actuator to forcibly drive the supercharger when the estimated amount of condensate in the oil pan is more than the preset amount, even if the operating state of the engine is in the given non-supercharging range. Therefore, the controller forcibly drive the supercharger to accelerate the warm-up of the supercharger, only when the amount of condensate in the oil pan is more than the preset amount, and the possibility of the condensate being produced in the intake passage upstream of the supercharger is high, thereby preventing the freezing of condensate in the supercharger.

Moreover, when the amount of condensate in the oil pan is below the preset amount, since the possibility of the condensate being produced in the intake passage is low, the fuel consumption can be reduced by omitting the forcible drive of the supercharger.

The controller may forcibly drive the supercharger, when a temperature of the supercharger is lower than the preset temperature (e.g., 0° C.) and the estimated amount of condensate is more than the preset amount.

According to this configuration, the controller forcibly drives the supercharger only when the temperature related to the supercharger is lower than the preset temperature and the amount of condensate is more than the preset amount, because there is a possibility of condensate being produced in the intake passage and being frozen inside the supercharger, thereby preventing the freezing inside the supercharger. Fuel consumption can be reduced by forcibly driving the supercharger effectively.

The controller may estimate the amount of condensate in the oil pan based on a condensate increasing amount calculated based on an accumulated value of an amount of air inhaled into the engine by the time a temperature of oil stored in the oil pan reaches a preset oil temperature, and an evaporating amount of condensate calculated based on the temperature of the oil stored in the oil pan above the preset oil temperature, the amount of condensate in the oil pan, and an operating time of the engine.

According to this configuration, the amount of condensate in the oil pan can be estimated with sufficient accuracy by calculating the condensate increasing amount as above based on that the amount of the condensate in proportion to an inhaled air amount accumulated value inhaled by the time the oil temperature reaches a preset temperature is accumulated in the oil pan, and calculating the condensate evaporating amount as above based on the assumption that the condensate evaporates in proportion to the oil temperature above the preset oil temperature, the amount of condensate in the oil pan, and the operating time.

The actuator may include an electromagnetic clutch configured to engage the supercharger with an output shaft of the engine, a bypass passage bypassing the supercharger, and a bypass valve disposed in the bypass passage. The controller may engage the electromagnetic clutch and open and close the bypass valve according to a target supercharging pressure, when the engine operating state is in the supercharging range, and release the electromagnetic clutch and open the bypass valve, when the engine operating state is in the non-supercharging range. The controller may close the bypass valve and forcibly drive the supercharger, when the estimated amount of condensate is more than the preset amount, even if the operating state of the engine is in the non-supercharging range.

According to this configuration, the controller can supply intake air while reducing a channel resistance because it releases the electromagnetic clutch and opens the bypass valve when the engine operating state is in the non-supercharging range.

Moreover, when the estimated amount of condensate is more than the preset amount, the controller closes the bypass valve and forcibly drives the supercharger even if the engine operating state is in the non-supercharging range. Therefore, the warm-up (temperature increase) of the supercharger is accelerated, and even during a cold start, the condensate produced by evaporation from the oil pan, condensation in the intake passage, and entering the supercharger will not be frozen.

The controller may engage the electromagnetic clutch and close the bypass valve, while forcibly driving the supercharger.

According to this configuration, by forcibly driving the supercharger, the temperature increase of the supercharger is accelerated.

The controller may estimate a temperature increasing amount and a temperature decreasing amount of the supercharger, and estimate the temperature of the supercharger based on a difference between the estimated temperature increasing and decreasing amounts.

The controller may estimate the temperature increasing amount of the supercharger, based on at least one of an amount of the intake air, an ambient temperature, a rotation speed of the supercharger, a pressure upstream of the supercharger, and a pressure downstream of the supercharger.

The controller may estimate the temperature decreasing amount based on a traveling speed of a vehicle.

According to this configuration, the controller estimates the temperature increasing amount of the supercharger based on the parameters related to a supercharging state of the supercharger and estimates the temperature decreasing amount based on the parameters related to a cooling performance of the supercharger. Therefore, the controller can estimate the temperature related to the supercharger with sufficient accuracy.

DETAILED DESCRIPTION OF THE DISCLOSURE

Figure 1:
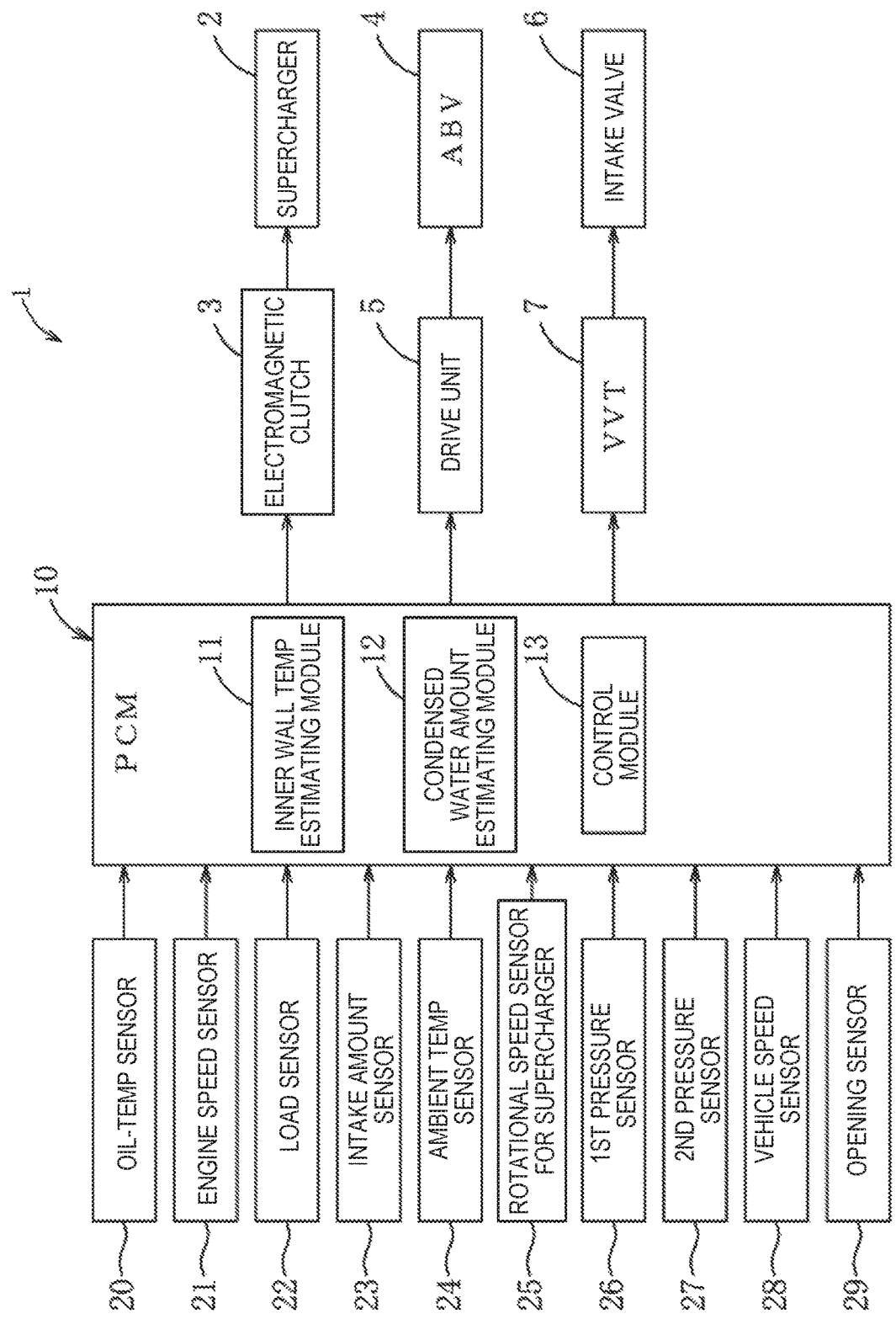
FIG. 1 is a block diagram schematically illustrating a configuration of a supercharging device according to one embodiment of the present disclosure.

Hereinafter, one form for implementing the present disclosure is described based on FIGS. 1 to 8. As illustrated in FIG. 1, a supercharging device 1 for an engine of this embodiment mainly includes a supercharger 2, an electromagnetic clutch 3 which drives the supercharger 2, a bypass valve (hereinafter, referred to as "ABV") 4, a drive unit 5 which opens and closes the ABV 4, an intake valve 6 which opens and closes an intake port, a variable valve timing mechanism (hereinafter, referred to as "VVT") 7 which changes open and close timings of the intake valve, and a power train control module (hereinafter, referred to as "PCM") 10 (i.e., a controller).

The PCM 10 of the supercharging device 1 is electrically connected to various sensors, such as an engine speed sensor 21, an engine load sensor 22 (throttle opening sensor), an intake amount sensor 23 which detects an amount of intake air introduced into the engine, an ambient temperature sensor 24, a rotational speed sensor 25 of the supercharger 2, an oil-temperature sensor 20 which detects a temperature of lubricating oil for the engine, a first pressure sensor 26 which detects a pressure upstream of the supercharger 2, a second pressure sensor 27 which detects a pressure downstream of the supercharger 2, a vehicle speed sensor 28, and an opening sensor 29 which detects an opening of a grille shutter (not illustrated) which adjusts an amount of air introduced into an engine room from the front of the vehicle, while the vehicle is traveling.

First, an outline configuration of in-series multi-cylinder engine with the supercharger for an automobile is described.

<Intake and Exhaust Systems of Engine>

Figure 2:
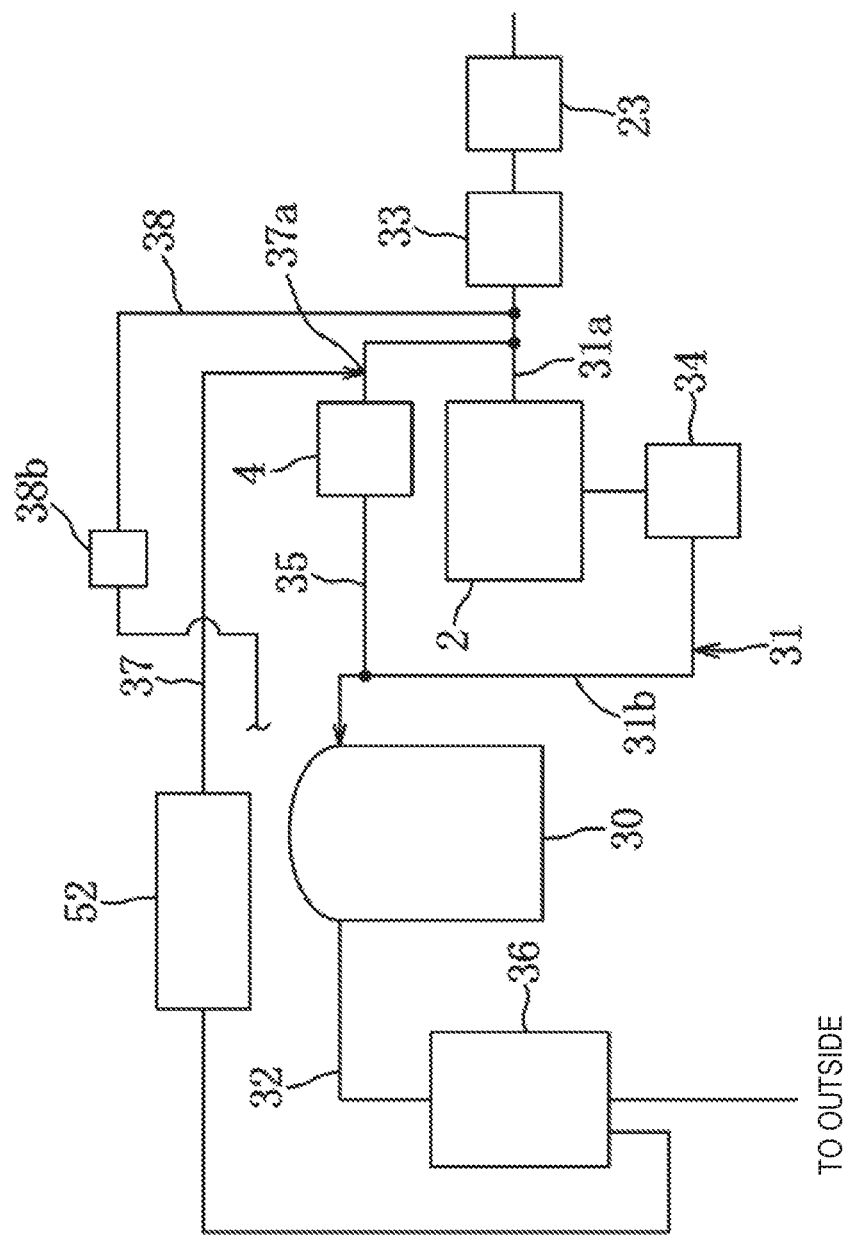
FIG. 2 is a block diagram illustrating intake and exhaust systems of an engine including the supercharging device.

As illustrated in FIG. 2, the intake and exhaust system of the engine is comprised of a cylinder 30 which forms an engine combustion chamber, an intake passage 31 through which intake air is introduced into the cylinder 30 via the intake valve 6, and an exhaust passage 32 which discharges exhaust gas from the cylinder 30 via an exhaust valve (not illustrated).

In the intake passage 31, from upstream to downstream, the intake amount sensor 23 comprised of an airflow sensor, a throttle valve 33 which adjusts an amount of intake air, the supercharger 2 which compresses the intake air and supplies the compressed air to the cylinder 30, and an intercooler 34 which cools the intake air discharged from the supercharger 2, are disposed. The intake passage 31 is provided with a bypass passage 35 which bypasses the supercharger 2 and connects an intake passage part 31*a* upstream of the supercharger 2 to an intake passage part 31*b* downstream of the supercharger 2. The ABV 4 which changes a passage cross-sectional area of the bypass passage 35 is provided at an intermediate location of the bypass passage 35. A blowby gas passage 38 is provided to connect a crank case of the engine to the intake passage part 31*a*, and a positive crankcase ventilation (PCV) valve 38*b* which is a differential pressure operation type valve is attached to the blowby gas passage 38.

The supercharger 2 is driven by a supercharger actuator when an operating state of the engine is in a given supercharging range, and is stopped when the engine operating state is in a non-supercharging range. Here, the supercharger 2 of this embodiment is assumed to be an internal compression type supercharger with a high demand of reducing the drive loss, for example, a Lysholm supercharger comprised of two rotors and a casing which accommodates these rotors, but may also be a blow-type, Roots type supercharger.

An emission control device 36 which purifies the exhaust gas is disposed in the exhaust passage 32. An exhaust gas recirculation (EGR) passage 37 is provided to recirculate a portion of the exhaust gas from a part of the exhaust passage 32 downstream of the emission control device 36 to the bypass passage 35, as EGR gas. The EGR passage 37 is connected to a part of the bypass passage 35 upstream of the ABV 4.

Figure 4:
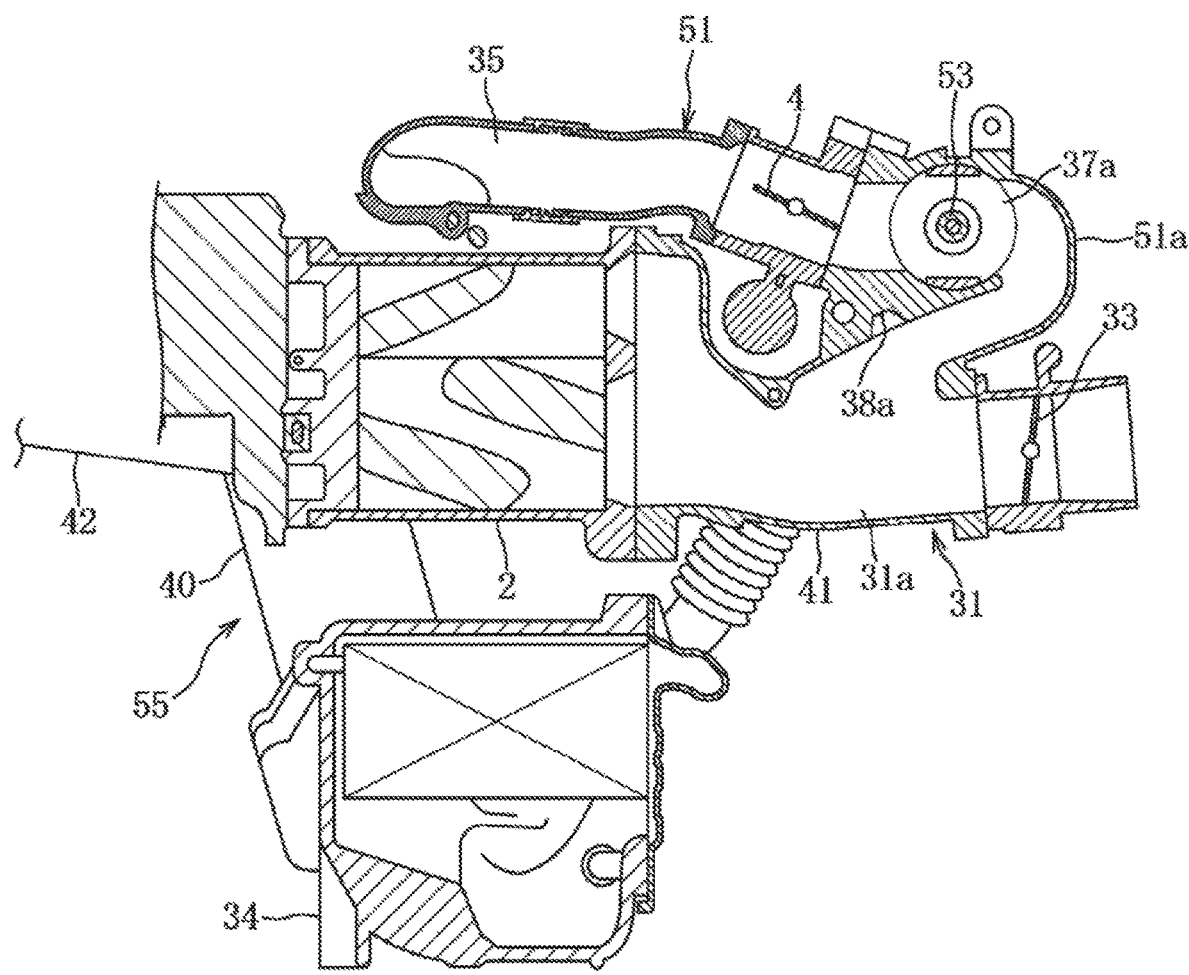
FIG. 4 is a vertical cross-section of a substantial part of the intake system of the engine.

As illustrated in FIG. 4, the bypass passage 35 is branched upwardly from the intake passage part 31*a* upstream of the supercharger 2, extends above the supercharger 2, and is connected to the intake passage part 31*b* downstream of the supercharger 2. An EGR gas introduction part 37*a* of the EGR passage 37 to the intake passage 31 is formed in a part of the bypass passage 35 extending above the supercharger 2. The intercooler 34 is disposed below the supercharger 2. A blowby gas introduction part 38*a* from the blowby gas passage 38 to the intake passage part 31*a* is formed in an upper wall part upstream of the supercharger 2 and downstream of the throttle valve 33.

<Structure of Intake and Exhaust Systems of Engine>

Figure 3:
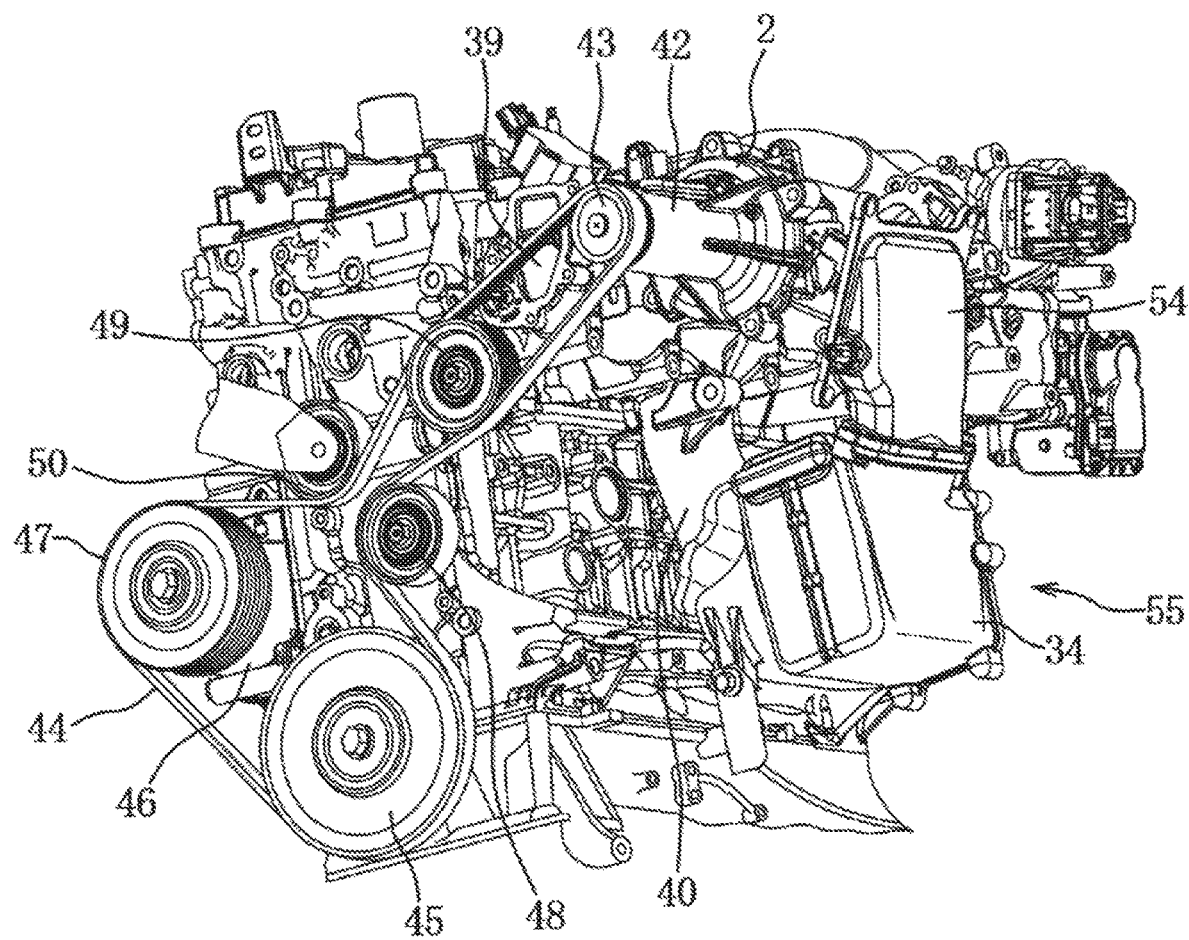
FIG. 3 is a perspective view of the engine.

This engine is a front intake and rear exhaust type, transverse engine in which lineup directions of the cylinders (in the longitudinal directions of the crankshaft) is oriented in vehicle width directions. The emission control device 36 has an oxidation catalyst and a particulate filter therein. As illustrated in FIG. 3, a surge tank 39 extends in the cylinder lineup directions along a side surface part of an engine body, and is connected to intake ports of the engine cylinders. An intake manifold includes the surge tank 39, and an intake air introduction pipe part 40 which is integrally formed with the surge tank 39, and is made of metal (in this embodiment, aluminum alloy). The intake air introduction pipe part 40 extends below the surge tank 39.

This engine is the four-cylinder engine having two intake ports for each cylinder. The intake manifold is provided with a total of eight branch intake passages (not illustrated) corresponding to the two intake ports of each cylinder. Each branch intake passage extends from the surge tank 39, and is fixed to the engine body at a part near the branch intake passage.

The supercharger 2 is a mechanical supercharger driven by an output shaft (crankshaft) of the engine as a power source, and a rotation shaft thereof is oriented in the cylinder lineup directions at a front and side part of the surge tank 39. As illustrated in FIG. 4, an upstream intake pipe 41 extending in the cylinder lineup directions is directly coupled to the supercharger 2. Intake air is introduced into the supercharger 2 from the upstream intake pipe 41. The upstream intake pipe 41 constitutes the intake passage part 31*a* of the intake passage 31 upstream of the supercharger 2.

A clutch housing 42 of the supercharger 2 projects to the opposite side of the upstream intake pipe 41 with respect to the supercharger 2. The electromagnetic clutch 3 which drives the supercharger 2 by the engine output shaft is accommodated in the clutch housing 42. A transmission belt 44 is wound around a pulley 43 coupled to an input shaft of the electromagnetic clutch 3. The PCM 10 electrically controls a duty ratio of the electromagnetic clutch 3 so that the electromagnetic clutch 3 is fully engaged at the duty ratio of 100% and is fully released at the duty ratio of 0%. The electromagnetic clutch 3, the bypass passage 35, and the ABV 4 correspond to an "actuator" which drives the supercharger 2.

As illustrated in FIG. 3, the transmission belt 44 is wound around a crank pulley 45 coupled to the output shaft of the engine, and a pulley 47 coupled to a drive shaft of a water pump 46, in addition to the pulley 43 of the supercharger 2. Idlers 48 and 49 and a tension pulley 50 give a suitable tension to the transmission belt 44, and also give proper wrapping angles to the pulleys 43 and 47 of the supercharger 2 and the water pump 46, respectively.

As illustrated in FIG. 4, a bypass pipe 51 which constitutes the bypass passage 35 is branched from the upstream intake pipe 41 which constitutes the intake passage part 31*a* upstream of the supercharger 2. The bypass pipe 51 is branched from an upper surface of the upstream intake pipe 41 at a location downstream of the throttle valve 33 provided to the upstream intake pipe 41, and extends obliquely above the throttle valve 33. The bypass pipe 51 is folded from the part extending obliquely upward so as to be curved above the supercharger 2. The bypass pipe 51 extends in the cylinder lineup directions above the supercharger 2 toward the center of the surge tank 39, from a folded part 51*a*.

As illustrated in FIG. 2, the EGR passage 37 which recirculates exhaust gas to the intake system from the exhaust system is connected at a location downstream of the folded part 51*a* of the bypass pipe 51. The EGR passage 37 leads exhaust gas to the intake system from the location downstream of the particulate filter of the emission control device 36. An EGR cooler 52 which cools exhaust gas to be recirculated to the intake system is provided to an intermediate part of the EGR passage 37.

As illustrated in FIG. 4, an EGR valve 53 which controls a recirculating amount of exhaust gas is provided to the EGR gas introduction part 37*a* which is a connection of the EGR passage 37 to the bypass pipe 51. Moreover, the ABV 4 is provided to the bypass pipe 51 downstream of the EGR valve 53.

As illustrated in FIGS. 3 and 4, a discharge pipe 54 for supercharging, the intercooler 34, and the intake air introduction pipe part 40 constitute a downstream intake pipe 55 which leads intake air to the surge tank 39 from the supercharger 2. The downstream intake pipe 55 is formed in a U-shape where the intercooler 34 is disposed at a lowermost part thereof as a whole, when seen in the cylinder lineup directions.

In the intake and exhaust systems of the engine, when the supercharger 2 is not driven, intake air flows from the intake passage part 31*a* upstream of the supercharger 2 illustrated in FIG. 4 into the surge tank 39 through the bypass passage 35, and is then inhaled into the cylinder 30. When EGR gas is introduced into the bypass passage 35 from the EGR gas introduction part 37a or blowby gas is introduced into the bypass passage 35 and the intake passage part 31a from the blowby gas passage 38 and the blowby gas introduction part 38a, moisture contained in the EGR gas or the blowby gas is cooled and condensed on the wall surface of the intake passage 31 to produce condensate. This condensate tends to be accumulated at the bottom of the upstream intake passage part 31a. The produced condensate tends to enter into a gap of the supercharger 2 together with intake air flow, where it may be frozen when the engine is stopped and the ambient temperature is low.

As illustrated in FIG. 1, the PCM 10 includes an inner wall temperature estimating module 11 which estimates an inner wall temperature of the supercharger 2, a condensate amount estimating module 12 which estimates an amount of condensate accumulated in the oil pan, and a control module 13 which controls operations of the supercharger 2, the ABV 4, and the intake valve 6. The PCM 10 is comprised of a processor 14 (i.e., a CPU (Central Processing Unit)), a ROM, a RAM, an IN-side interface, and an OUT-side interface. The ROM stores program(s) and data for carrying out various controls, and the RAM stores a processing region used by the processor 14 executing a series of processings. The processor 14 is configured to execute the inner wall temperature estimating module 11, the condensate amount estimating module 12, and the control module 13 to perform their respective functions. These modules are stored in the ROM.

First, the inner wall temperature estimating module 11 is described. The inner wall temperature estimating module 11 estimates a temperature increasing amount and a temperature decreasing amount of the supercharger 2, and then estimates the inner wall temperature of the supercharger 2 based on a difference between the estimated temperature increasing and decreasing amounts. The temperature increasing amount is calculated using a given equation based on parameters related to the supercharging state of the supercharger 2, such as the amount of intake air, the ambient temperature, the rotation speed of the supercharger 2, a pressure upstream of the supercharger 2, and a pressure downstream of the supercharger 2, which are detected by the sensors 23-27, respectively. Moreover, the temperature decreasing amount is calculated using the given equation based on parameters related to the cooling performance of the supercharger 2, such as the traveling speed and the grille shutter opening, which are detected by the sensors 28 and 29, respectively.

Here, the grille shutter (not illustrated) is disposed in front of a radiator disposed in an engine bay of the vehicle, and opening and closing of the grille shutter is controlled according the traveling speed, etc. Since the amount of air introduced into the engine bay while the vehicle is traveling can be changed by adjusting the opening of the grille shutter, the temperature decreasing amount of the supercharger 2 also changes, and therefore, the grille shutter opening is reflected in the equation.

Next, the condensate amount estimating module 12 is described. When the amount of condensate accumulated in the oil pan is more than a preset amount, the condensate evaporates, and it then flows, together with the blowby gas flow, into the upstream intake passage part 31a from the blowby gas passage 38, and then flows into the supercharger 2, and thereby the condensate may be frozen inside the supercharger 2 while the ambient temperature is low.

Thus, the condensate amount estimating module 12 estimates the amount of condensate accumulated in the oil pan. Although the condensate in the oil pan is mainly produced by the moisture contained in the intake air being condensed, most of the condensate is accumulated without evaporating when the engine temperature (oil temperature) is below 60° C. after an engine startup. Then, after the engine startup, when the oil temperature reaches above 60° C., the condensate starts evaporating to reduce the amount. The amount of condensate becomes negligible after a given period of time of engine operation.

The condensate amount estimating module 12 estimates the amount of condensate in the oil pan based on a condensate increasing amount calculated using a given equation based on an inhaled air amount accumulated value inhaled by the time the oil temperature reaches a preset temperature (e.g., 60° C.), and a condensate evaporating amount calculated using a given equation based on the oil temperature when the oil temperature is above the preset temperature, the amount of condensate in the oil pan, and an operating time.

The oil temperature is detected by the oil-temperature sensor 20. The inhaled air amount accumulated value is calculated by accumulating the amount of intake air detected by the intake amount sensor 23 after the engine startup. As for the amount of condensate in the oil pan, the amount of condensate sequentially calculated by the condensate amount estimating module 12. The operating time is an operating period of time after the engine startup.

Note that since the evaporating amount of the condensate increases as the amount of the recirculating blowby gas increases, it is desirable to correct the condensate evaporating amount by a given correction coefficient according to a period of time while the PCV 38b is opened. Moreover, since the evaporating amount of the condensate increases as an amount of oil jets to various sliding parts of the engine increases, it is desirable to correct the condensate evaporating amount by a given correction coefficient according to an accumulated amount of the oil jets.

Figure 6:
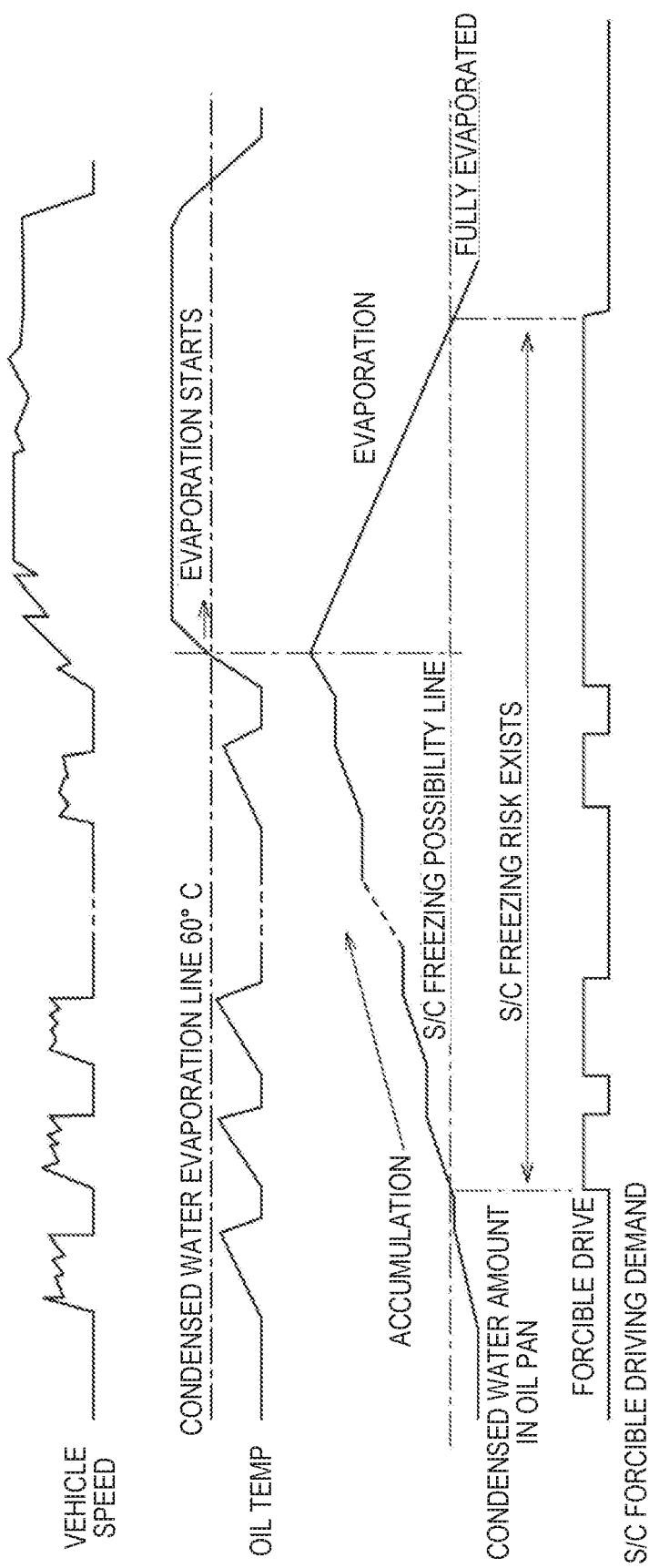
FIG. 6 is a timing chart illustrating changes in a traveling speed, an oil temperature, and an amount of condensate in an oil pan.

FIG. 6 is a timing chart illustrating the engine operating state (traveling state), the oil temperature, an estimated value of the amount of condensate in the oil pan, and a forcible drive pattern of the supercharger 2 (indicated as "S/C" in this figure) as one example. As illustrated in FIG. 6, when the vehicle starts traveling, the oil temperature then goes up to near the preset temperature (e.g., 60° C.), but when the vehicle stops, the oil temperature then drops. If traveling and stopping are repeated, the condensate which is the condensation produced from the moisture in the intake air is accumulated in the oil pan, and the amount of the condensate in the oil pan increases.

Then, if the traveling is continued for a long period of time, the oil temperature increases beyond the preset temperature and maintains the highest oil temperature corresponding to the highest engine temperature. When the oil temperature is above the preset temperature, the condensate in the oil pan evaporates continuously to reduce its amount, and finally reaches a fully-evaporated state so that the amount of condensate becomes negligible. In the supercharger control which will be described later based on FIG. 5, when the amount of condensate in the oil pan is more than the preset amount, a S/C forcible driving demand is issued for every time the vehicle starts traveling to forcibly drive the supercharger 2.

Next, the control module 13 is described. The control module 13 has a supercharging range map (not illustrated) where the supercharging range is set based on an engine speed and an engine load, and a target supercharging pressure map (not illustrated) where a target supercharging pressure is set based on the engine operating state in the supercharging range. When the engine operating state is in the supercharging range, the control module 13 engages the electromagnetic clutch 3, and opens and closes the ABV 4 (bypass valve) according to the target supercharging pressure.

Here, the control module 13 sets a degree of engagement (duty ratio) and the opening of the ABV 4 by the target supercharging pressure set based on the target supercharging pressure map. The control module 13 then outputs instruction signals according to the set degree of engagement and the set opening of the ABV 4 to the electromagnetic clutch 3 and the drive unit 5, respectively.

Figure 7:
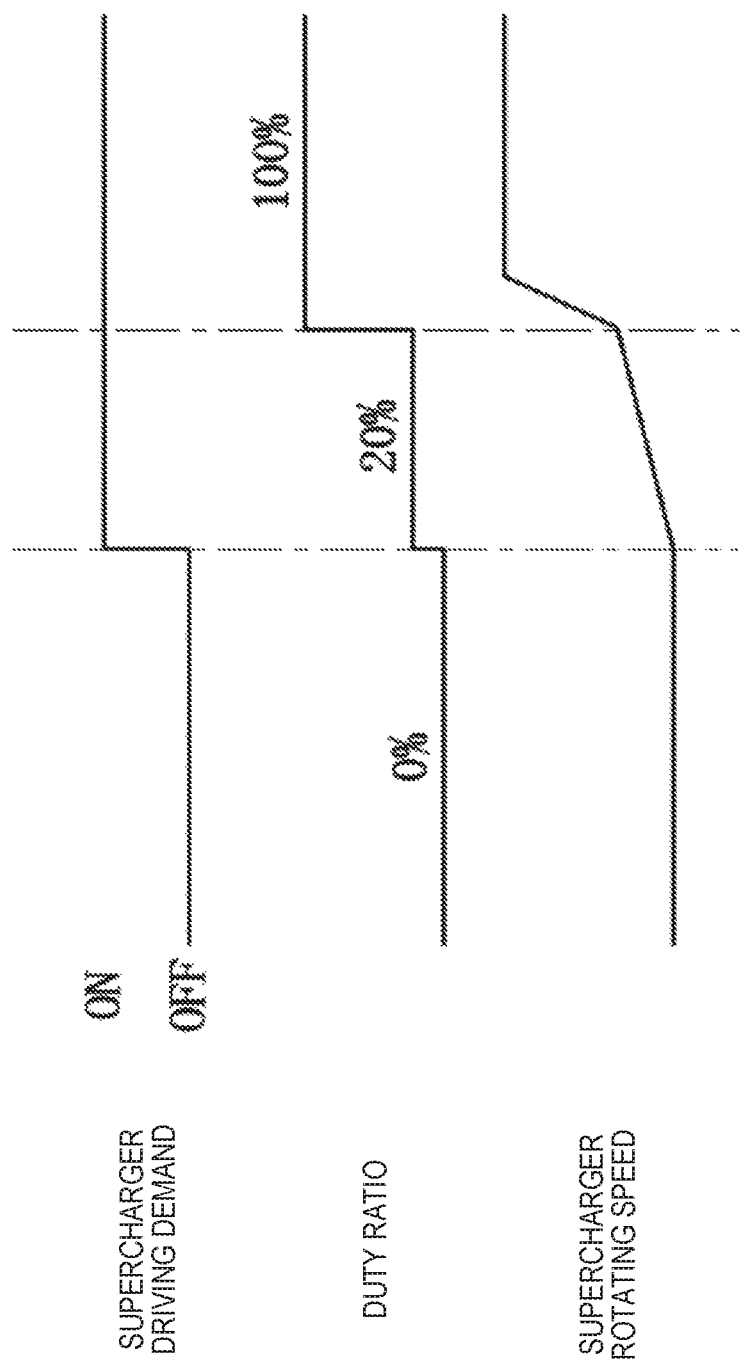
FIG. 7 is a timing chart illustrating a supercharger driving demand, a duty ratio, and a supercharger rotation speed.

As illustrated in FIG. 7, if an amount of change in the duty ratio to be outputted to the electromagnetic clutch 3 is above a given value, for example, if shifting the duty ratio to 100% from 0%, the control module 13 is provided with a control period at an intermediate duty ratio (e.g., 20%) in order to suppress a rapid change (engagement shock) of the rotation speed of the supercharger 2. Note that during normal operation, the opening of the ABV 4 is smaller as the duty ratio of the electromagnetic clutch 3 becomes higher. The control module 13 releases or disengages the electromagnetic clutch 3 and opens the ABV 4 when the engine operating state is in the non-supercharging range.

Figure 5:
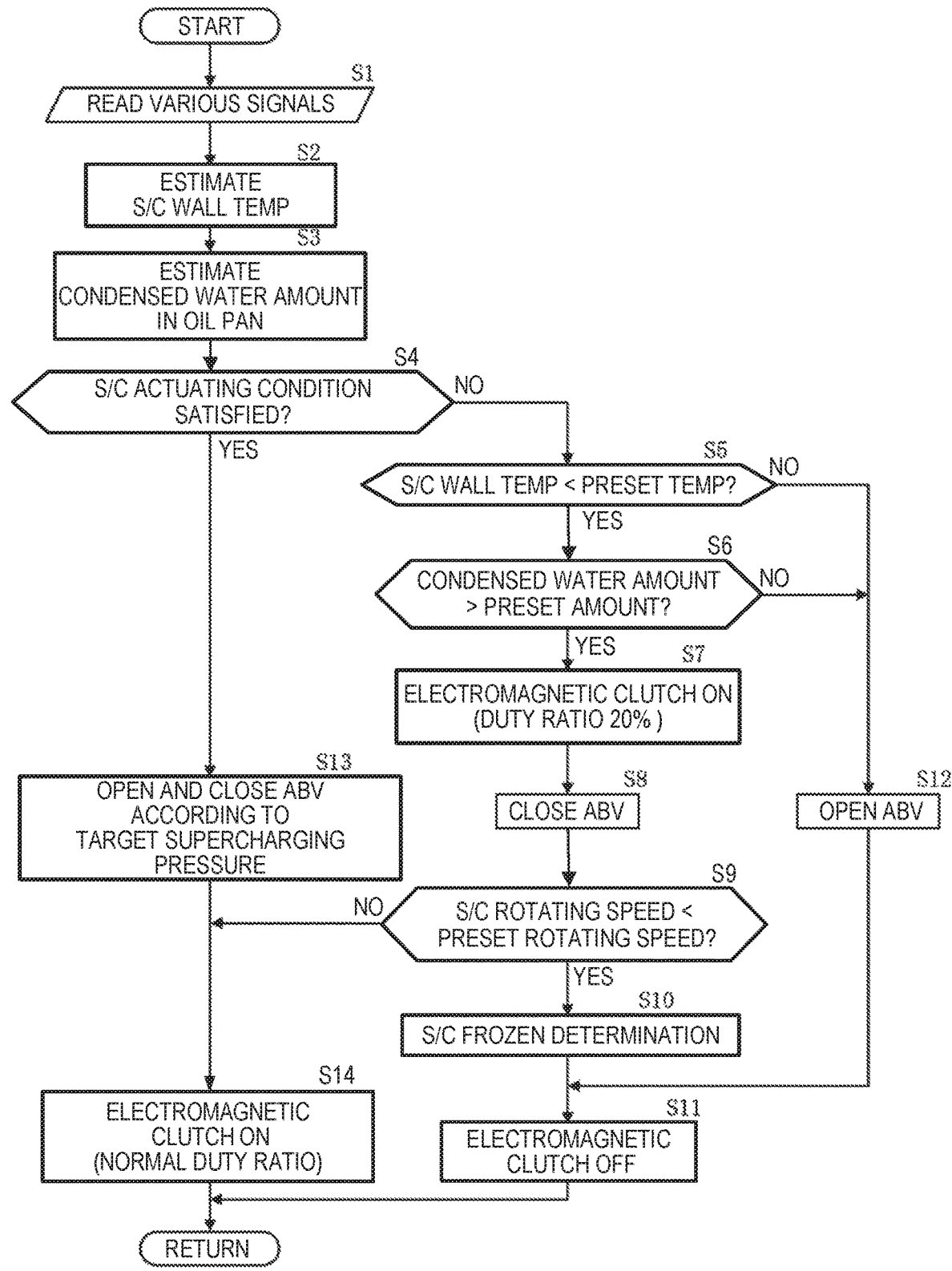
FIG. 5 is a flowchart of the supercharger control.

Next, the supercharger control peculiar to the present disclosure is described based on a flowchart of FIG. 5. Note that Si (i=1, 2, . . . ) indicates each step in this figure. This supercharger control is constantly executed by the PCM 10 while the engine is operating. The PCM 10 first reads various signals from the various sensors 20-29 at 51, and then executes a calculation to estimate the S/C wall temperature (the temperature of the supercharger) by the inner wall temperature estimating module 11 as described above at S2.

Next, at S3, the PCM 10 executes a calculation to estimate the amount of condensate in the oil pan by the condensate amount estimating module 12 as described above. Next, at S4, the PCM 10 determines whether an S/C actuating condition is satisfied (whether the engine operating state is in the supercharging range) based on the engine speed, the throttle opening, and the supercharging range map. If the determination is NO, the PCM 10 then determines whether the S/C wall temperature is lower than the preset temperature (e.g., 0° C.) at S5. If the determination of S5 is YES, the PCM 10 then shifts to S6, and on the other hand, if the determination of S5 is NO, the PCM 10 then shifts to S12.

At S6, the PCM 10 determines whether the amount of condensate in the oil pan calculated at S3 is more than the preset amount. If the determination is YES, the PCM 10 then shifts to S7, and on the other hand, if the determination of S6 is NO, the PCM 10 then shifts to S12. If the determinations of S5 and S6 are YES, since the condensate produced by moisture being evaporated from the oil pan and condensed in the upstream intake passage part 31a together with blowby gas may flow into the supercharger 2 and may be frozen, the PCM 10 executes the forcible drive of the supercharger 2, and if the supercharger 2 is frozen and the rotation speed of the supercharger 2 does not increase, the PCM 10 turns off the electromagnetic clutch 3 in order to prevent damages to the supercharger 2 due to freezing, as will be described below. If the rotation speed of the supercharger 2 increases by the forcible drive, the PCM 10 actuates the supercharger 2 in order to accelerate warm-up of the supercharger 2, although freezing is not a concern.

Figure 8:
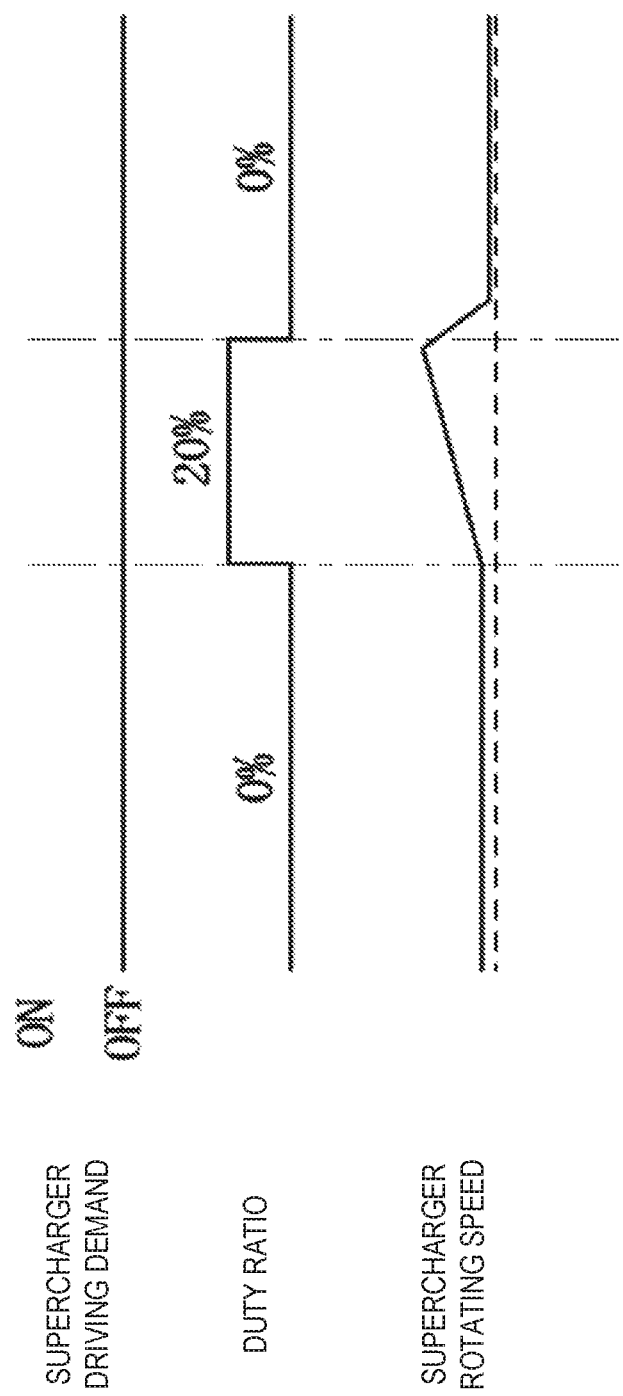
FIG. 8 is a timing chart illustrating the supercharger driving demand, the duty ratio, and the supercharger rotation speed, when the supercharger is forcibly driven.

At S7, the PCM 10 switches the electromagnetic clutch 3 to an imperfectly-engaged state (e.g., 20% of the duty ratio) to forcibly drive the supercharger 2, and closes the ABV 4 at next S8. FIG. 8 illustrates one example where the electromagnetic clutch 3 is imperfectly engaged to forcibly drive the supercharger 2. If there is no freezing in the supercharger 2 at this time, the rotation speed of the supercharger 2 increases, as illustrated in FIG. 8. At the next S9, the PCM 10 determines whether the S/C rotation speed is less than the preset rotation speed (i.e., whether the rotation speed of the supercharger 2 increased). If the rotation speed of the supercharger 2 does not increase by freezing etc., the determination of S9 becomes YES, and the PCM 10 then determines that the supercharger 2 is frozen at S10, then turns off the electromagnetic clutch 3 at 511, and then returns to S1.

On the other hand, if the rotation speed of the supercharger 2 increases and the determination of S9 becomes NO, the PCM 10 then shifts to S14, where the electromagnetic clutch 3 is switched to the engaged state at the normal duty ratio and is driven in order to accelerate the warm-up of the supercharger 2, and then returns to S1. If the determination of S5 is NO or the determination of S6 is NO, since the operating state is in the non-supercharging range, and since there is no possibility of the condensate being produced in the intake passage part 31a nor the condensate being frozen, the PCM 10 opens the ABV 4 at S12, and releases the electromagnetic clutch 3 at next S11, and then returns to S1.

If the engine operating state is in the supercharging range, i.e., if the determination of S4 is YES, the PCM 10 opens and closes the ABV 4 according to the target supercharging pressure at S13, switches the electromagnetic clutch 3 to the engaged state at the normal duty ratio and drives the electromagnetic clutch 3 at S14, and then returns to S1.

Next, operation and effects of the supercharging device 1 are described. The control module 13 causes the actuator to forcibly drive the supercharger 2 even when the amount of condensate in the oil pan estimated by the condensate amount estimating module 12 is more than the preset amount, and the engine operating state is in the given non-supercharging range. Therefore, the control module 13 forcibly drive the supercharger 2 to accelerate the warm-up of the supercharger 2, only when the amount of condensate in the oil pan is more than the preset amount, and the possibility of the condensate being produced in the intake passage part 31a upstream of the supercharger 2 is high, thereby preventing the freezing of condensate. Moreover, when the amount of condensate in the oil pan is below the preset amount, since the possibility of the condensate being produced in the intake passage 31 is low, fuel consumption can be reduced by omitting the forcible drive of the supercharger 2.

The control module 13 forcibly drives the supercharger 2 only when the temperature related to the supercharger 2 is lower than the preset temperature and the amount of condensate is more than the preset amount, because there is a possibility of condensate being produced in the intake passage part 31a and being frozen inside the supercharger 2, thereby preventing the freezing inside the supercharger 2. Fuel consumption can be reduced by forcibly driving the supercharger 2 effectively.

The condensate amount estimating module 12 can estimate the amount of condensate in the oil pan with sufficient accuracy by calculating the condensate increasing amount based on the accumulated value of the amount of air inhaled by the time it reaches the preset oil temperature, and calculating the condensate evaporating amount based on the oil temperature above the preset oil temperature, the amount of condensate in the oil pan, and the operating time.

The control module 13 can supply intake air while reducing the channel resistance because it releases the electromagnetic clutch 3 and opens the ABV 4 when the engine operating state is in the non-supercharging range. Moreover, when the amount of condensate estimated by the condensate amount estimating module 12 is more than the preset amount, the control module 13 closes the ABV 4 and forcibly drives the supercharger 2 even if the engine operating state is in the non-supercharging range. Therefore, the warm-up (temperature increase) of the supercharger 2 is accelerated, and even during a cold start, the condensate produced by evaporating from the oil pan, condensed in the intake passage 31, and entered into the supercharger 2 will not be frozen. Note that during the supercharger forcible drive, the control module 13 can continue the forcibly drive of the supercharger 2 while the ABV 4 is closed and the electromagnetic clutch 3 is engaged, to accelerate the temperature increase of the supercharger.

The control module 13 estimates the temperature related to the supercharger 2 based on the parameters related to the supercharging state of the supercharger 2 and the parameters related to the cooling performance of the supercharger 2. Therefore, the control module 13 can estimate the temperature increasing amount and the temperature decreasing amount of the supercharger 2 with sufficient accuracy, and can estimate the temperature related to the supercharger with sufficient accuracy.

Next, several modifications in which the previous embodiment is partially changed will be described.

Modification 1

Although in the previous embodiment the example where the supercharger temperature is estimated based on the parameters related to the supercharging state of the supercharger and the parameters related to the cooling performance of the supercharger, and the parameters related to the supercharging state are the amount of intake air, the ambient temperature, the rotation speed of the supercharger, the pressure upstream of the supercharger, and the pressure downstream of the supercharger is described, at least one of the five parameters may be used. Moreover, the temperature increasing amount may be estimated based on a combination of at least one of the five parameters and parameter(s) other than the five parameters. Similarly, although the example where the parameters related to the cooling performance of the supercharger are the traveling speed and the opening of the grille shutter is described, one of the two parameters may be used. Moreover, the temperature decreasing amount may be estimated based on a combination of one of the two parameters and parameter(s) other than the two parameters.

Modification 2

Although in the previous embodiment the example where the supercharger is of the Lysholm type is described, the present disclosure is not to limited to the mechanical supercharger but may also be applied to any types of superchargers, such as an electrically-driven supercharger which drives a blower by an electric motor, and a turbocharger.

Modification 3

The step S7 in FIG. 5 may be skipped, the electromagnetic clutch 3 may be released, and the ABV 4 is closed like S8.

Then, at S9, the rotation speed of the supercharger 2 may be compared with the preset rotation speed while the supercharger 2 is in the freely rotatable state. In this case, the rotation speed of the supercharger 2 will increase if there is no freezing in the supercharger 2, but the rotation speed of the supercharger 2 will not increase if freezing exists in the supercharger 2. Therefore, similar operation and effect to the supercharger control of FIG. 5 can be acquired. In the latter case, the supercharger 2 is forcibly driven by intake air flow.

Those skilled in the art may implement the present disclosure in other forms in which the above embodiment is changed variously, without departing from the subject matter of the present disclosure. The present disclosure also includes such changes. It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Supercharging Device
2 Supercharger
3 Electromagnetic Clutch
4 ABV
10 PCM
11 Inner Wall Temperature Estimating Module
12 Condensate Amount Estimating Module
13 Control Module
20 Oil-Temperature Sensor
35 Bypass Passage

What is claimed is:

1. A supercharging device for an engine, comprising:
a supercharger provided to an intake passage of the engine;
a blowby gas passage provided to connect a crank case of the engine to the intake passage upstream of the supercharger;
an actuator configured to drive the supercharger; and
a controller including a processor configured to control the actuator to drive the supercharger when an operating state of the engine is in a given supercharging range, and to stop the supercharger when the operating state is in a non-supercharging range, wherein
the actuator includes an electromagnetic clutch configured to engage the supercharger with an output shaft of the engine, a bypass passage bypassing the supercharger, and a bypass valve disposed in the bypass passage;
the controller is configured to estimate an inner wall temperature of the supercharger;
the controller is configured to estimate an amount of condensate accumulated in an oil pan, and
the controller is configured to close the bypass valve to cause the actuator to forcibly drive the supercharger when the estimated temperature of the supercharger is lower than a preset temperature and the estimated amount of condensate is more than a preset amount, even if the operating state is in the non-supercharging range.

2. The supercharging device of claim 1, wherein the controller is configured to estimate the amount of condensate in the oil pan based on:
a condensate increasing amount calculated based on an accumulated value of an amount of air inhaled into the engine by the time a temperature of oil stored in the oil pan reaches a preset oil temperature, and an evaporating amount of condensate calculated based on the temperature of the oil stored in the oil pan above the preset oil temperature, the amount of condensate in the oil pan, and an operating time of the engine.

3. The supercharging device of claim 1,
wherein the controller is configured to engage the electromagnetic clutch and open and close the bypass valve according to a target supercharging pressure, when the engine operating state is in the supercharging range, and release the electromagnetic clutch and open the bypass valve, when the engine operating state is in the non-supercharging range.

4. The supercharging device of claim 3, wherein the controller is configured to engage the electromagnetic clutch and close the bypass valve, while forcibly driving the supercharger.

5. The supercharging device of claim 1, wherein the controller is configured to estimate a temperature increasing amount and a temperature decreasing amount of the supercharger, and estimate the temperature of the supercharger based on a difference between the estimated temperature increasing and decreasing amounts.

6. The supercharging device of claim 5, wherein the controller is configured to estimate the temperature increasing amount of the supercharger, based on at least one of an amount of intake air, an ambient temperature, a rotation speed of the supercharger, a pressure upstream of the supercharger, and a pressure downstream of the supercharger.

7. The supercharging device of claim 5, wherein the controller is configured to estimate the temperature decreasing amount based on a traveling speed of a vehicle.

\* \* \* \* \*